United States Patent
LeBon et al.

(10) Patent No.: US 6,427,358 B1
(45) Date of Patent: Aug. 6, 2002

(54) ARTICULATED ANCHOR FOR MEASURING TAPES

(75) Inventors: Natascha LeBon, Westbank; Michael H. Boudreau, Salmon Arm, both of (CA)

(73) Assignee: 614332 British Columbia Ltd., Salmon Arm (CA)

( * ) Notice: Subject to any disclaimer, the term of this patent is extended or adjusted under 35 U.S.C. 154(b) by 9 days.

(21) Appl. No.: 09/690,713

(22) Filed: Oct. 18, 2000

Related U.S. Application Data

(60) Provisional application No. 60/206,716, filed on May 24, 2000, and provisional application No. 60/172,193, filed on Dec. 17, 1999.

(51) Int. Cl.⁷ .................................................. G01B 3/10
(52) U.S. Cl. .............................. 33/758; 33/755; 33/770
(58) Field of Search ........................ 33/755, 756, 758, 33/770, 768

(56) References Cited

U.S. PATENT DOCUMENTS

| | | | |
|---|---|---|---|
| 1,023,863 A | * 4/1912 | Melville | 33/768 |
| 2,396,929 A | 3/1946 | Putnam | |
| 2,711,030 A | 6/1955 | Drew et al. | |
| 3,774,308 A | 11/1973 | Jurentkuff | |
| 3,834,030 A | * 9/1974 | Hanson | 33/770 |
| 4,353,167 A | * 10/1982 | Martin | 33/770 |
| 4,924,597 A | * 5/1990 | Tursi | 33/758 |
| 5,079,848 A | 1/1992 | Oshiro et al. | |
| 5,349,760 A | 9/1994 | DeVito | |
| 5,782,007 A | * 7/1998 | Harris | 33/770 |
| 5,845,412 A | * 12/1998 | Arcand | 33/770 |
| D432,035 S | * 10/2000 | Harris | D10/74 |
| 6,223,443 B1 | * 5/2001 | Jacobs | 33/760 |
| 6,295,739 B1 | * 10/2001 | Kraft | 33/770 |

FOREIGN PATENT DOCUMENTS

| | | | |
|---|---|---|---|
| DE | 38 42 953 A1 | 7/1990 | |
| GB | 876073 | 8/1961 | |
| JP | 360155903 A | * 8/1985 | 33/758 |

* cited by examiner

*Primary Examiner*—Diego Gutierrez
*Assistant Examiner*—Mirellys Jagan
(74) *Attorney, Agent, or Firm*—Antony C. Edwards

(57) ABSTRACT

An articulated anchor for measuring tapes has a planar base having opposite parallel first and second planar surfaces. A releasable adhesive pad is secured to a first planar surface for releasably adhering planar base portion to a surface of an object to be measured. A spherical ball is mounted on the second planar surface so as to extend outwardly therefrom. A ball joint housing is rotatably mounted over the ball so as to form a ball joint which may be articulated in both horizontal and vertical planes. The ball joint housing may be advantageously a rectangular solid having a ball receiving cavity formed in a lower surface and, oppositely disposed on an upper surface a slot for mating of the pull tab therein. The ball receiving cavity may include opposed facing spherical segments or dimples for retaining the ball therebetween.

45 Claims, 5 Drawing Sheets

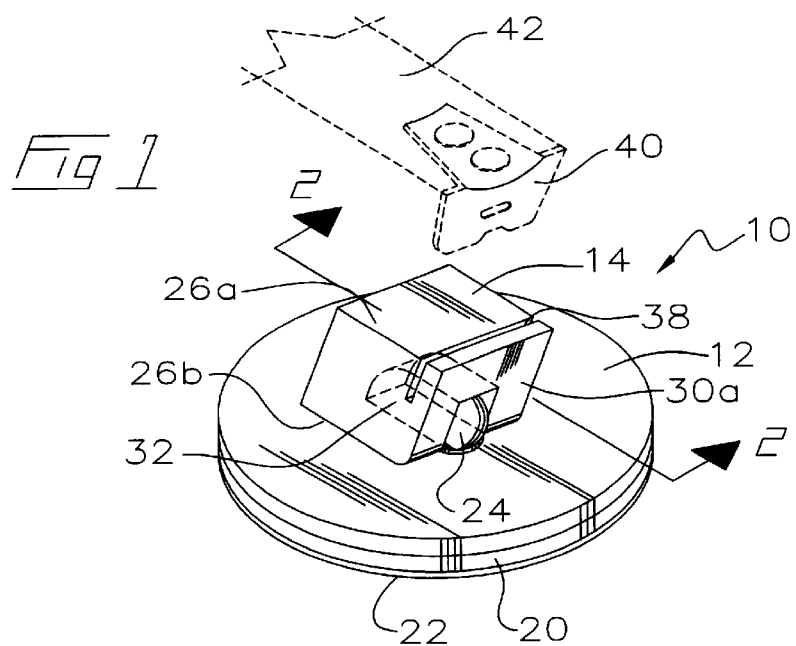
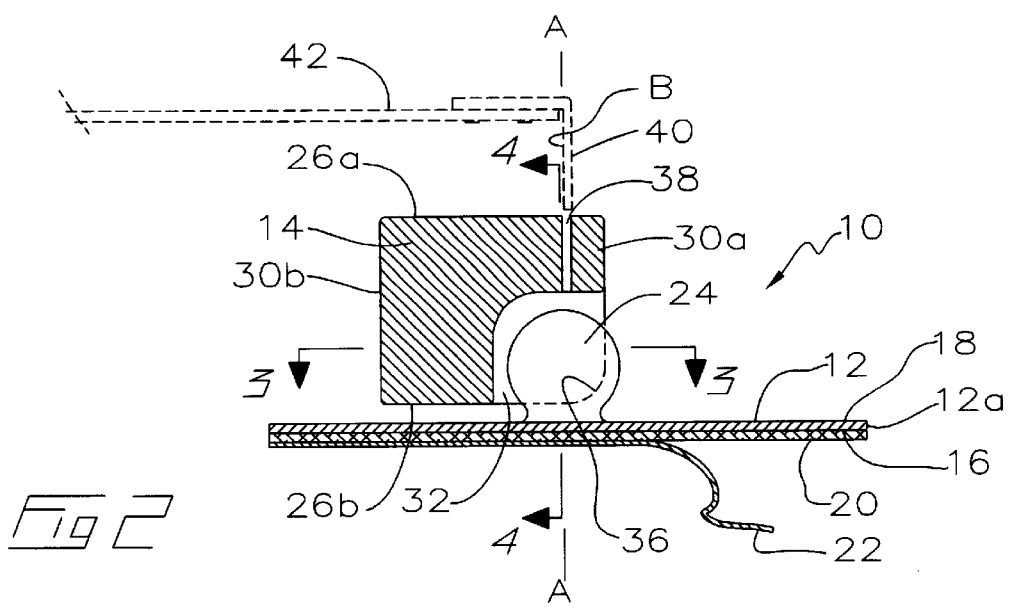

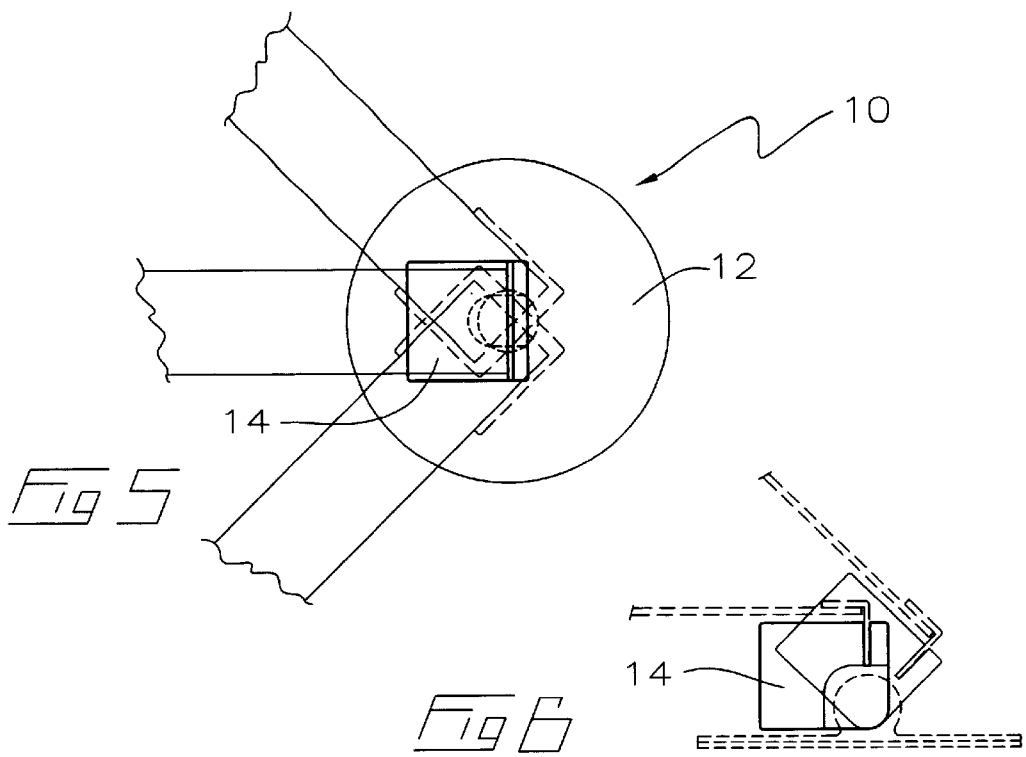
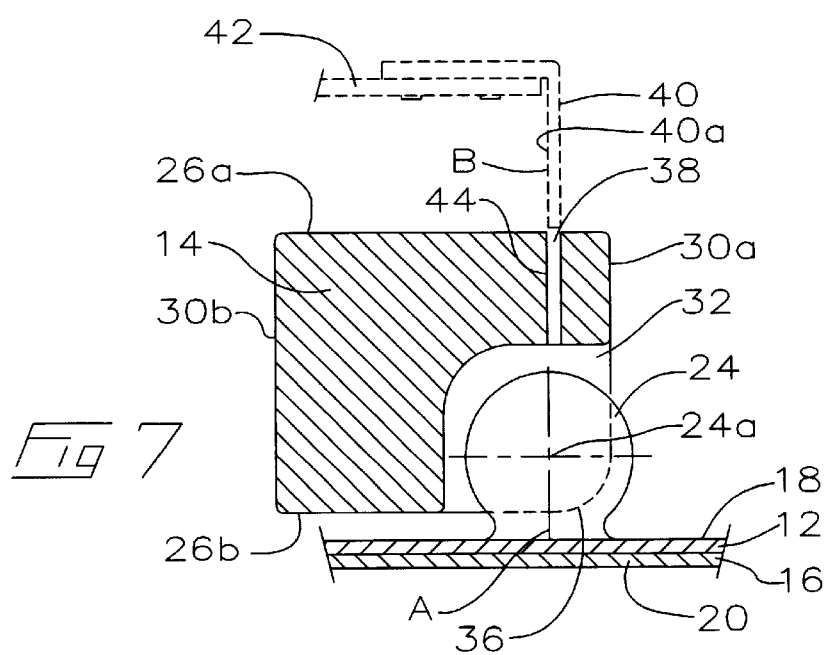

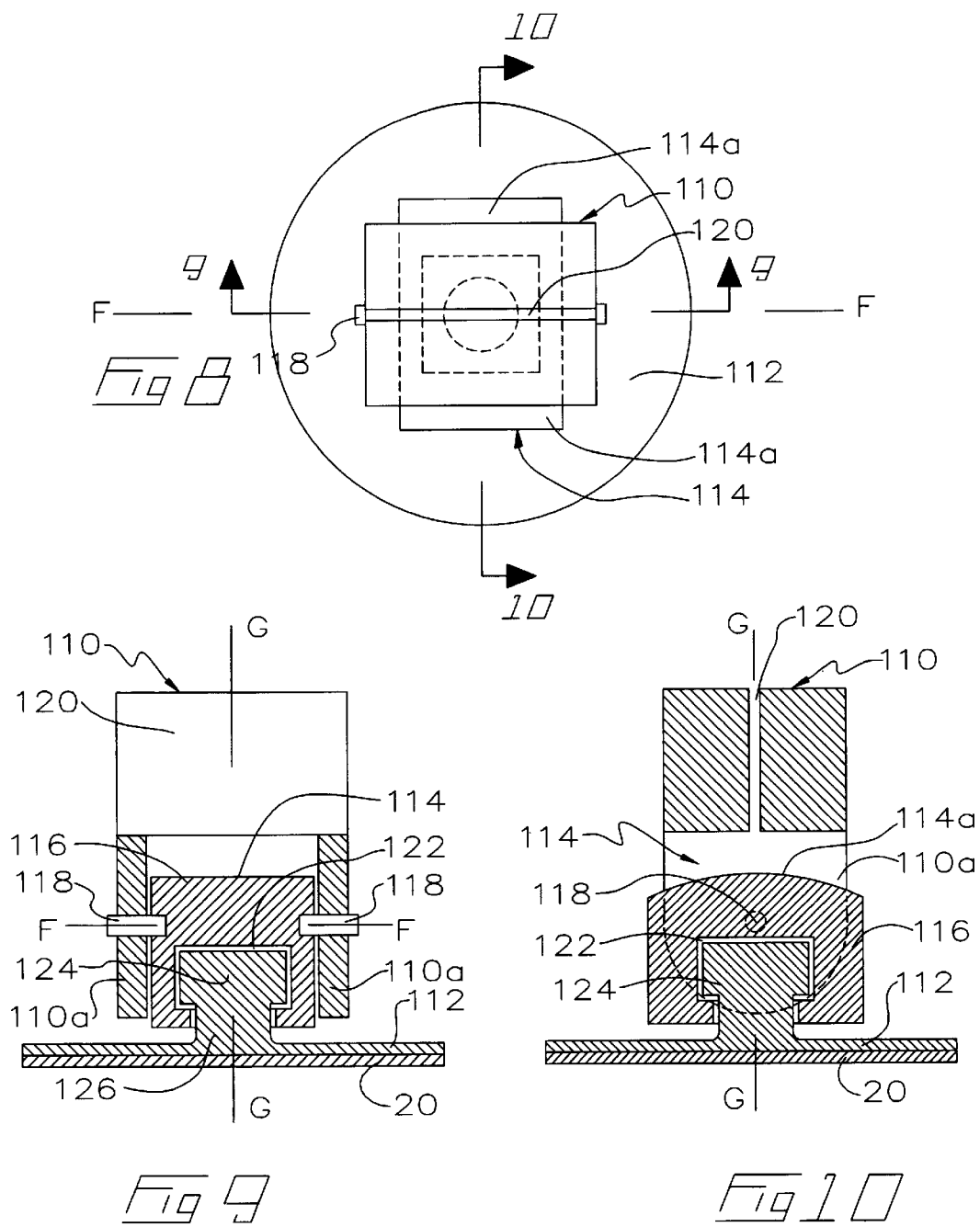

ARTICULATED ANCHOR FOR MEASURING TAPES

CROSS REFERENCE TO RELATED APPLICATIONS

This application claims priority from United States Provisional Patent Application No. 60/206,716 filed May 24, 2000 titled Tape Measure Anchor and United States Provisional Patent Application No. 60/172,193 filed Dec. 17, 1999 titled Quick Measure Concept.

FIELD OF THE INVENTION

This invention relates to an apparatus for securing the distal end of a tape measure to the surface of an object being measured thus permitting a single person to easily and accurately measure distances greater than the distance that can be spanned by the person's arms.

BACKGROUND OF THE INVENTION

Measuring tapes in general are manufactured with a convenient pull tab, hook or flange at a distal end, immediately adjacent the zero marking on the tape. A user secures the zero mark using the tab as a stop against an immobile edge. The tape is extended from the measuring tape as the tape is metered out against the resistance of the secured tab. The desired dimension of an object is thus measured.

The use of such pull tabs requires that an edge or slot be available at the starting zero point of the measurement to anchor the tab. Where this is possible a user may extend the tape sufficiently to locate the required dimension. If difficulty is experienced with securing the tab, which is common, other means of securing the tab must be found such as, for example, using a second person to hold the tab in place. Where linear dimensions of planar surfaces must be measured such as those required by building contractors, interior designers, realtors or handymen there is often difficulty experienced with the anchoring of the pull tab so that a second person must be available.

The articulated anchor for measuring tapes of the present invention provides a means whereby extended linear measurements may be easily and accurately made by one person without either the inconvenience of having to repeatedly re-secure the distal end tab at the commencement point of the measurement, or the inconvenience of engaging a second person to hold the tab.

SUMMARY OF THE INVENTION

An articulated anchor for measuring tapes has a planar base having opposite parallel first and second planar surfaces. A releasable adhesive pad is secured to a first planar surface for releasably adhering planar base portion to a surface of an object to be measured.

A spherical ball is mounted on the second planar surface so as to extend outwardly therefrom. A ball joint housing is rotatably mounted overeat ball so as to form a ball joint which may be articulated in both horizontal and vertical planes.

The ball joint housing may be advantageously a rectangular solid having a ball receiving cavity formed in a lower surface and, oppositely disposed on an upper surface a slot for mating of the pull tab therein. The ball receiving cavity may include opposed facing, less than hemispherical spherical segments or dimples for retaining the ball therebetween.

A releasable adhesive pad is mounted to the second planar surface of the base. The pad is manufactured from a soft resilient material such as silicone, urethane, polyurethane or any material which when produced has a durometer rating less than or equal to 30, scale shore A, so as to provide inherent surface tackiness for ready releasable mounting of the pad and base to both smooth and rough surfaces. In one preferred embodiment the pad material is as disclosed in PCT published patent application Ser. No. CA99/00256 entitled Multi-Purpose Re-Usable Adhesive Pad, for the invention of Hiscock et al and sold under the trademark Octa-Pad by Hiscoco Innovations of Kelowna, British Columbia.

In summary the tape measure anchor of the present invention includes a rigid base and a tape measure engaging member for mounting to, either permanently or releasably, the tape measure housing containing the retracted tape measure or a flange or tab on a free end of the retractable tape measure so as to retain the flange or tab in a slot in the member. A two-degree-of-rotational-freedom rotatable coupler is mounted to, so as to extend between, the base and to the member. The coupler is mounted between the base and the member so as to rotatably mount the member to the base for two degree of freedom rotation of the member relative to the base. A means is provided for releasably mounting, by adhesion, the base to a structure to be measured. The coupler may be a ball joint or a pinned universal joint, or a gimballed joint. The slot may lie in a first plane and the first plane may intersect the coupler or ball or a pinned axis of rotation. In one aspect of the present invention the first plane intersects a center of rotation of the coupler or ball or axis of rotation.

The coupler has first and second orthogonal axes of rotation. The first axis of rotation is perpendicular to a lower planar surface of the base for rotational motion of the member relative to the base, that is, where the rotational motion has a component in a plane parallel to the lower planar surface of the base. The second axis of rotation lies in the plane parallel to the lower planar surface of the base for the rotational motion of the member relative to the base, that is, where the rotational motion has a component in a plane perpendicular to the lower planar surface of the base.

The tape measure engaging member is a socket housing when the coupler is a spherical ball joint. The ball joint includes a ball rigidly mounted to the base and a socket formed in the socket housing. The socket is adjacent a first end of the socket housing so as to allow pivoting of the socket housing about the second axis of rotation between a lowered or horizontal position and an elevated or non-horizontal position. In this embodiment the first and second axes of rotation intersect at a center of curvature of the ball.

In the first plane is orthogonal to the lower planar surface of the base when the member or housing is in the lowered position and the first plane is substantially parallel to the lower planar surface of the base when the member or housing is in the elevated position.

In one preferred embodiment the base is a generally planar plate and the socket housing is elongate along a longitudinal axis perpendicular to the first plane. The socket housing has an upper surface shaped, for example, flat so that the tape measure lies flush along at least a portion of the upper surface when the tab on the free end of the tape measure is releasably retained in the slot.

The plate may advantageously be symmetric about the first axis. For example, the plate may be circular. Further advantageously, the socket housing may be a parallelepiped, for example, rectangular.

In a further aspect of the present invention, the socket is formed by opposed facing concave spherical segments spaced apart on either side of a ball receiving cavity, wherein the spherical segments lie on, and are symmetric about, the second axis. In one embodiment not intended to be limiting, the ball receiving cavity is a channel socket extending parallel to the longitudinal axis. In that embodiment, the slot extends downwardly from the upper surface of the socket housing so as to intersect the socket or a plane containing the socket.

In yet a further aspect, a lower edge of the first end, common with a lower surface of the housing, wherein the lower surface of the housing is opposite the upper surface of the housing, is rounded about an axis parallel to the second axis. This allows mounting of the housing closely adjacent the base without the lower edge of the first end obstructing rotation of the housing about the second axis as the housing is rotated between the lowered and elevated positions.

The means for releasably mounting the base to an object to be measured may be a resilient adhesive gasket.

BRIEF DESCRIPTION OF THE DRAWINGS

FIG. 1 is an isometric view of a preferred embodiment of the measuring tape anchoring device of the present invention.

FIG. 2 is a sectional view taken along line 2—2 of FIG. 1.

FIG. 5 is a plan view of the measuring tape anchoring device illustrating partial articulation in a horizontal plane.

FIG. 6 is side elevational view of the measuring tape anchoring device illustrating partial articulation in a vertical plane.

FIG. 7 is an enlargement of a portion of sectional view taken along line 2—2 of FIG. 1.

FIG. 8 is, in plan view, an alternative embodiment of the tape measure anchor of the present invention.

FIG. 9 is a cross-sectional view along line 9—9 in FIG. 8.

FIG. 10 is a cross-sectional view along line 10—10 in FIG. 8.

DETAILED DESCRIPTION OF THE PREFERRED EMBODIMENTS

Figure 3:
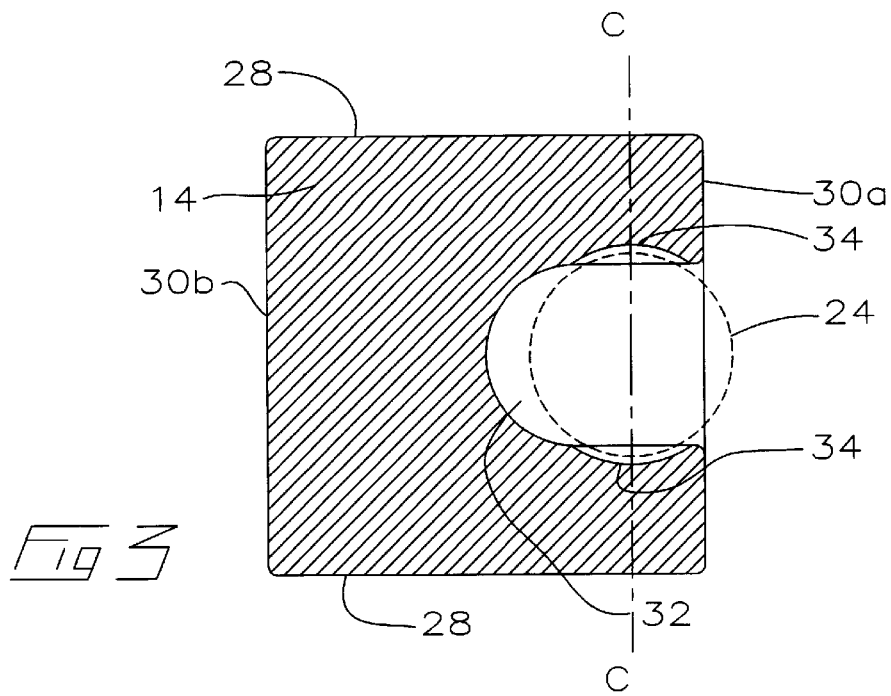
FIG. 3 is a horizontal sectional view of the anchoring device taken along line 3—3 of FIG. 2.

As see in FIGS. 1 and 2, the articulated anchor 10 of the present invention has a planar rigid base 12 to which a ball joint housing 14 is articulately mounted. Base 12 is illustrated as being disk-shaped but may be of other configurations such as triangular or square. Base 12 has first and second planar surfaces 16 and 18 respectively. Base 10 may be manufactured from a variety of suitable materials such as stainless steel.

A soft inherently tacky or sticky resilient adhesive pad 20 made from silicone, urethane, polyurethane or the like having a durometer rating less than or equal to 30, scale shore A, is releasably adhered to surface 16 of base 10. Pad 20 may be protected, until ready for use, by means of an easily removable, impervious flexible cap or covering 22. Pad 20 may be an Octa-Pad™, sold by Hiscoco Innovations of Kelowna, British Columbia.

A spherical ball 24, which may be manufactured from material identical to that of base 12, is mounted centrally of, so as to project outwardly from, second planar surface 18. Ball 24 is secured to base 12 by adhesive, spot welding or the like. Where base 12 is round and, for example, 2 inches in diameter, a vertical axis of symmetry A through the center of ball 24 will be one inch from any edge of base 10.

Figure 4:
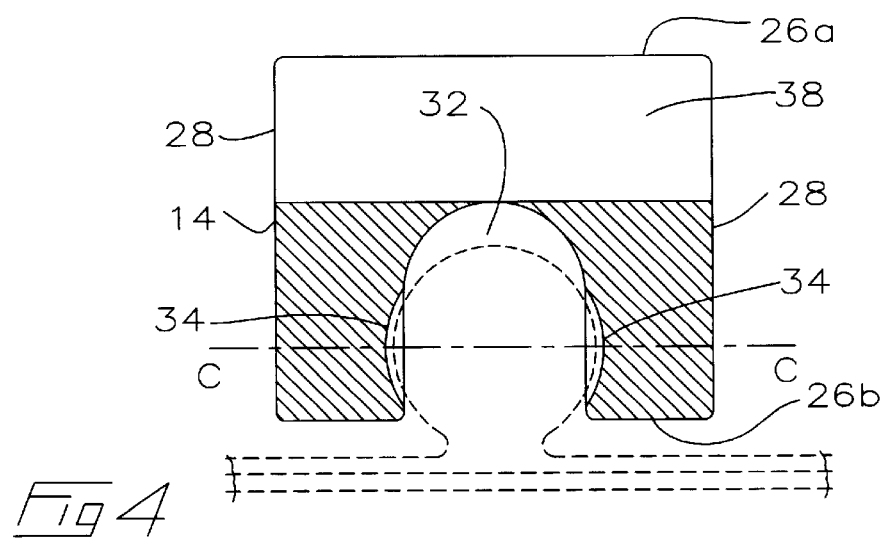
FIG. 4 is a vertical sectional view taken along line 4—4 of FIG. 2.

As seen in FIGS. 3 and 4, housing 14 is a generally rectangular solid made of nylon or other non-deformably rigid material. Housing 14 has upper and lower surfaces 26a and 26b respectively, opposite side surfaces 28, and opposite end surfaces 30a and 30b. A channel 32 is formed in lower surface 26b intermediate of side surfaces 28. The channel extends from end-to-end of housing 14, between end surfaces 30a and 30b. Opposed facing less-than-hemispherical spherical segments formed as dimples 34 lying on axis C across channel 32 provide a socket to secure ball 24 therein. The corner 36 at the intersection between lower surfaces 26b and end surface 30a is radiused, for example about the center of curvature 24a of ball 24 as seen in FIG. 7, to allow unobstructed rotation of housing 14 on ball 24. With ball 24 secured within dimples 34 housing 14 is free to articulate as seen in FIGS. 5 and 6 in both horizontal and vertical planes, that is, about orthogonal axes A and C as seen in FIGS. 2–4.

Upper surface 26a of housing 14 has a narrow slot 38 formed therein, generally at right angles to channel 32 and inwardly of end surface 30a so as to vertically align over center of curvature 24a of ball 24. Slot 38 is sized to accept in frictional engagement therein a pull tab 40 of a measuring tape 42. Side wall 44 of slot 38 lies in plane B coincident, within plane B, with a common centerline between dimples 34 and vertical axis of symmetry A of ball 24. Inserting pull tab 40 in slot 38 abuts surface 40a of tab 40 against side wall 44 so as to also be coincident with the axis A. Surface 40a of tab 40 is then positioned exactly, in one preferred embodiment, one inch (25.4 mm) from edge 12a of base 12 allowing the user to make quick and accurate horizontal or inclined linear measurements by merely adding one inch to the measurement indicated on the tape measure. Vertical measurements require minor compensation to account for the radius of ball 24 and the combined thickness of base 12 and adhesive pad 20. In one preferred embodiment, this compensation is approximately one quarter of an inch (6.35 mm).

In an alternative embodiment as seen in FIGS. 8–10, coupler housing 110 is rotatably mounted to planar base 112 by means of a 2 degree of freedom coupler 114. Coupler 114 is a rotational mounting plate 116 pivotally mounted by pins 118 within a yoke formed by opposite downwardly depending arms 110a. Pins 118 lie on axis of rotation F. The upper surface 114a of coupler 114 is radiused about pins 118 so that coupler housing 110 can rotate about pins 118 on yoke arms 110a. Slot 120 for receiving the tab of the tape measure therein, is formed in the upper surface of coupler housing 110.

A cylindrical cavity 122 is formed within rotational mounting plate 116 for rotatable mounting therein of a correspondingly shaped rotation pedestal 124. Pedestal 124 is rigidly mounted by shaft 126 to the upper surface of base 112. Shaft 126 is journalled through a bore which extends from cavity 122 through to the lower surface of mounting plate 116. Coupler housing 110 may thus be rotated about axis of rotation G by rotation of mounting plate 116 about axis G relative to pedestal 124.

Figure 11:
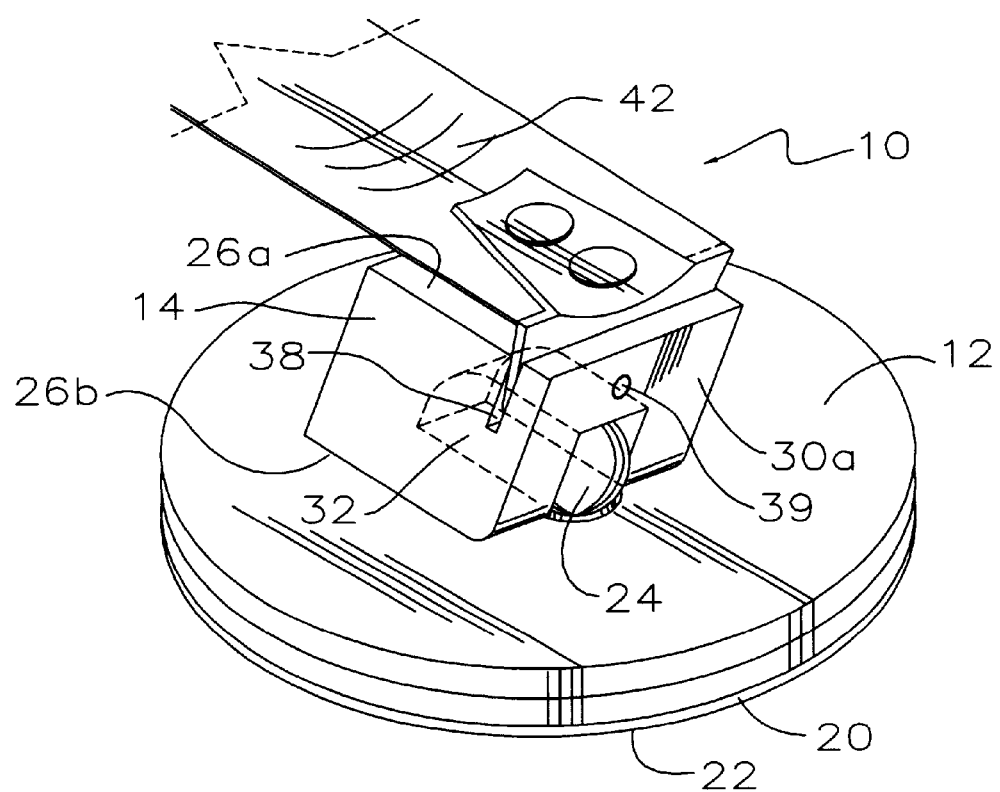
FIG. 11 is, in perspective view, an alternative embodiment of the device of FIG. 1 wherein the end of the tape measure is permanently mounted to the housing.

An alternative embodiment within the scope of the present invention is illustrated in FIG. 11. In this embodiment, tab 40 is permanently mounted in slot 38, for example by means of a pin 39 or otherwise as would be known to one skilled in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A tape measure anchor comprising:
   a rigid base,
   a tape measure engaging member for retaining a free end of a retractable tape measure in a slot therein adjacent said base,
   a two-degree-of-rotational-freedom rotatable coupler mounted to said base and to said member and between said base and member so as to rotatable mount said member to said base for two degree of freedom rotation of said member relative to said base, and
   means for releasably mounting by adhesion said base to a structure to be measured.

2. The anchor of claim 1 wherein said coupler is a ball joint.

3. The anchor of claim 2 wherein said coupler has a first and second orthogonal axes of rotation, said first axis of rotation perpendicular to a lower planar surface of said base for rotational motion of said member relative to said base wherein said rotational motion has a component in a plane parallel to said lower planar surface of said base, said second axis of rotation lying in said plane parallel to said lower planar surface for said rotational motion of said member relative to said base wherein said rotational motion has a component in a plane perpendicular to said lower planar surface of said base.

4. The anchor of claim 3 wherein said member is a socket housing, said spherical ball joint comprises a ball rigidly mounted to said base and a socket formed in said socket housing, adjacent a first end of said socket housing so as to allow pivoting of said socket housing about said second axis of rotation between a lowered position and an elevated position, wherein said first and second axes of rotation intersect at a center of curvature of said ball.

5. The anchor of claim 4 wherein said slot lies in a first plane and said first plane is orthogonal to said lower planar surface of said base when said member is in said lowered position.

6. The anchor of claim 5 wherein said first plane is substantially parallel to said lower planar surface of said base when said member is in said elevated position.

7. The anchor of claim 6 wherein said first plane intersects said center of curvature of said ball.

8. The anchor of claim 7 wherein said base is a generally planar plate and said socket housing is elongate along a longitudinal axis perpendicular to said first plane, and wherein said socket housing has an upper surface shaped so that said tape measure lies flush along at least a portion of said upper surface when a tab on said free end of said tape measure is releasably retained in said slot.

9. The anchor of claim 8 wherein said ball is mounted to said base at a center of said plate.

10. The anchor of claim 9 wherein said plate is symmetric about said first axis.

11. The anchor of claim 10 wherein said plate is circular.

12. The anchor of claim 8 wherein said socket is formed by opposed facing concave spherical segments spaced apart on either side of a ball receiving cavity, wherein said spherical segments lie on, and are symmetric about, said second axis.

13. The anchor of claim 12 wherein said ball receiving cavity is a channel extending parallel to said longitudinal axis.

14. The anchor of claim 13 wherein said slot extends downwardly from said upper surface of said socket housing so as to intersect said channel.

15. The anchor of claim 8 wherein said socket housing is a parallelepiped.

16. The anchor of claim 15 wherein said housing is rectangular.

17. The anchor of claim 8 wherein a lower edge of said first end, common with a lower surface of said housing, said lower surface of said housing opposite said upper surface of said housing, is rounded about an axis parallel to said second axis so as to allow mounting of said housing closely adjacent said base without said lower edge of said first end obstructing rotation of said housing about said second axis as said housing is rotated between said lowered and elevated positions.

18. The anchor of claim 1 wherein said slot lies in a first plane and said first plane intersects said coupler.

19. The anchor of claim 18 wherein said first plane intersects a center of rotation of said coupler.

20. The anchor of claim 1 wherein said coupler has first and second orthogonal axes of rotation, said first axis of rotation perpendicular to a lower planar surface of said base for rotational motion of said member relative to said base wherein said rotational motion has a component in a plane parallel to said lower planar surface of said base, said second axis of rotation lying in said plane parallel to said lower planar surface for said rotational motion of said member relative to said base wherein said rotational motion has a component in a plane perpendicular to said lower planar surface of said base.

21. The anchor of claim 1 wherein said means for releasably mounting is a resilient adhesive gasket.

22. The anchor of claim 1 wherein said free end is releasably retained in said slot.

23. The anchor of claim 1 wherein said free end is permanently mounted in said slot by mounting means.

24. A tape measure comprising:
   a rigid base,
   a tape measure engaging member for retaining a free end of a retractable tape measure in a slot therein adjacent said base,
   a two-degree-of-freedom rotatable coupler mounted to said base and to said member and between said base and said member so as to rotatably mount said member to said base for two degree of freedom rotation of said member relative to said base, and
   means for releasably mounting by adhesion said base to a structure to be measured,
   wherein said coupler is a ball joint.

25. The anchor of claim 24 wherein said coupler has a first and second orthogonal axes of rotation, said first axis of rotation perpendicular to a lower planar surface of said base for rotational motion of said member relative to said base wherein said rotational motion has a component in a plane parallel to said lower planar surface of said base, said second axis of rotation lying in said plane parallel to said lower planar surface for said rotational motion of said member relative to said base wherein said rotational motion has a component in a plane perpendicular to said lower planar surface of said base.

26. The anchor of claim 25 wherein said member is a socket housing, said spherical ball joint comprises a ball rigidly mounted to said base and a socket formed in said socket housing, adjacent a first end of said socket housing so as to allow pivoting of said socket housing about said second axis of rotation between a lowered position and an elevated position, wherein said first and second axes of rotation intersect at a center of curvature of said ball.

27. The anchor of claim 26 wherein said slot lies in a first plane and said first plane is orthogonal to said lower planar surface of said base when said member is in said lowered position.

28. The anchor of claim 27 wherein said first plane is substantially parallel to said lower planar surface of said base when said member is in said elevated position.

29. The anchor of claim 28 wherein said first plane intersects said center of curvature of said ball.

30. The anchor of claim 29 wherein said base is a generally planar plate and said socket housing is elongate along a longitudinal axis perpendicular to said first plane, and wherein said socket housing has an upper surface shaped so that said tape measure lies flush along at least along a portion of said upper surface when a tab on said free end of said tape measure is releasably retained is said slot.

31. The anchor of claim 30 wherein said ball is mounted to said base at a center of said plate.

32. The anchor of claim 31 wherein said plate is symmetrical about said first axis.

33. The anchor of claim 32 wherein said plate is circular.

34. The anchor of claim 30 wherein said socket is formed by opposed facing concave spherical segments spaced apart on either side of a ball receiving cavity, wherein said spherical segments lie on, and are symmetric about, said second axis.

35. The anchor of claim 34 wherein said ball receiving cavity is a channel extending parallel to said longitudinal axis.

36. The anchor of claim 35 wherein said slot extends downwardly from said upper surface of said socket housing so as to intersect said channel.

37. The anchor of claim 30 wherein said socket housing is a parallelepiped.

38. The anchor of claim 37 wherein said housing is rectangular.

39. The anchor of claim 30 wherein a lower edge of said first end, common with a lower surface of said housing, said lower surface of said housing opposite said upper surface of said housing, is rounded about an axis parallel to said second axis so as to allow mounting of said housing closely adjacent said base without said lower edge of said first end obstructing rotation of said housing about said second axis as said housing is rotated between said lowered and elevated positions.

40. The anchor of claim 24 wherein said slot lies in a first plane and said first plane intersects said coupler.

41. The anchor of claim 40 wherein said first plane intersects a center of rotation of said coupler.

42. The anchor of claim 24 wherein said means for releasably mounting is a resilient adhesive gasket.

43. The anchor of claim 24 wherein said free end is releasably retained in said slot.

44. The anchor of claim 24 wherein said free end is permanently mounted in said slot by mounting means.

45. A tape measure anchor comprising:
 a rigid base,
 a tape measure engaging member for retaining a free end of a retractable tape measure in a slot therein adjacent said base,
 a two-degree-of-freedom rotatable coupler mounted to said base and to said member and between said base and said member so as to rotatably mount said member to said base for two degree of freedom rotation of said member relative to said base, and
 means for releasably mounting by adhesion said base to a structure to be measured,
 wherein said coupler has first and second orthogonal axes of rotation, said first axis of rotation perpendicular to a lower planar surface of said base for rotational motion of said member relative to said base wherein said rotational motion has a component in a plane parallel to said lower planar surface of said base, said second axis of rotation lying in said plane parallel to said lower planar surface for said rotational motion of said member relative to said base wherein said rotational motion has a component on a plane perpendicular to said lower planar surface of said base.

* * * * *